US012534677B2

(12) United States Patent
Bertram

(10) Patent No.: US 12,534,677 B2
(45) Date of Patent: *Jan. 27, 2026

(54) SYSTEMS AND METHODS OF PROCESSING WASTE TO GENERATE ENERGY AND GREEN HYDROGEN

(71) Applicant: Integrated Energy LLC, Huntington Beach, CA (US)

(72) Inventor: Karen Bertram, Huntington Beach, CA (US)

(73) Assignee: Integrated Energy LLC, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/249,469

(22) Filed: Jun. 25, 2025

(65) Prior Publication Data

US 2025/0320419 A1   Oct. 16, 2025

Related U.S. Application Data

(63) Continuation of application No. 18/199,772, filed on May 19, 2023, now Pat. No. 12,359,139.

(51) Int. Cl.
*F23G 7/00* (2006.01)
*B01J 6/00* (2006.01)
(Continued)

(52) U.S. Cl.
CPC ............. *C10J 3/72* (2013.01); *B01J 6/008* (2013.01); *C01B 3/02* (2013.01); *F23G 7/001* (2013.01); *C10J 2300/0909* (2013.01); *C10J 2300/0916* (2013.01); *C10J 2300/0923* (2013.01); *C10J 2300/1606* (2013.01);
(Continued)

(58) Field of Classification Search
CPC .......... C02F 11/10; C02F 11/13; C10B 57/10; C10B 53/00; F23G 5/04; F23G 7/001; F23G 2207/30; F23G 2900/00001; F23G 2201/303; F23G 2900/50001; F23G 2206/10; F23G 2201/10; F23G 2201/304; F23G 2207/60; F23G 2209/262;
(Continued)

(56) References Cited

U.S. PATENT DOCUMENTS 7,435,080 B2 * 10/2008 Joklik ................. F02D 41/1497
431/3
9,422,480 B2 * 8/2016 Funk ....................... C10B 47/44
(Continued)

OTHER PUBLICATIONS

Dominguez et al., "Production of bio-fuels by high temperature pyrolysis of sewage sludge using conventional and microwave heating", Bioresource Technology, vol. 67, 2006, pp. 1185-1193. (Year: 2006).*

(Continued)

Primary Examiner — Lorne E Meade
(74) Attorney, Agent, or Firm — Fish IP Law, LLP; Tomas A. Prieto

(57) ABSTRACT

Systems and methods for producing green hydrogen from a source material (e.g., biowaste) are contemplated. The source material is at least partially dehydrated to produce a dried intermediate and recovered water. The dried intermediate is pyrolyzed to produce syngas and a char. The recovered water is electrolyzed to produce oxygen and green hydrogen.

18 Claims, 2 Drawing Sheets

(51) Int. Cl.
    *C01B 3/02*     (2006.01)
    *C10J 3/72*     (2006.01)

(52) U.S. Cl.
    CPC .. *C10J 2300/165* (2013.01); *C10J 2300/1675* (2013.01); *C10J 2300/1684* (2013.01); *F23G 2201/10* (2013.01); *F23G 2201/303* (2013.01); *F23G 2206/203* (2013.01); *F23G 2209/26* (2013.01)

(58) Field of Classification Search
    CPC ............... F23G 2209/12; C10J 3/463; C10J 2300/0923; C10J 2300/092; C10J 2300/0909
    See application file for complete search history.

(56) References Cited

U.S. PATENT DOCUMENTS

| | | | | |
|---|---|---|---|---|
| 10,619,923 | B2* | 4/2020 | Latein | F26B 21/04 |
| 12,359,139 | B2* | 7/2025 | Bertram | C10B 53/02 |
| 2018/0306506 | A1* | 10/2018 | Latein | F26B 23/002 |
| 2023/0071602 | A1* | 3/2023 | Abbassi Monjezi | C02F 1/445 |

OTHER PUBLICATIONS

Mohammadpour et al., "Utilization of oxygen from water electrolysis—Assessment for wastewater treatment and aquaculture", Chemical Engineering Science, Elsevier Ltd., vol. 246, 2021, pp. 1-8. (Year: 2021).*

Kundu et al., "Removal of PFASs from biosolids using a semi-pilot scale pyrolysis reactor and the application of biosolids derived biochar for the removal of PFASs from contaminated water", Environ. Sci.: Water Res. Technol., 2021, vol. 7, pp. 638-649. (Year: 2021).*

Barghash et al., Cost benefit analysis for green hydrogen production from treated effluent: The case study of Oman, Frontiers in Bioengineering and Biotechnology, vol. 10, 2022, pp. 1-14. (Year: 2022).*

Thoma et al., "Pyrolysis processing of PFAS-impacted biosolids, a pilot study", Journal of the Air & Waste Management Association, vol. 72, No. 4, 2022, pp. 309-318. (Year: 2022).*

* cited by examiner

SYSTEMS AND METHODS OF PROCESSING WASTE TO GENERATE ENERGY AND GREEN HYDROGEN

This application is a continuation of U.S. application Ser. No. 18/199,772, filed May 19, 2023. U.S. application Ser. No. 18/199,772 and all other extrinsic references are incorporated by reference in their entirety.

FIELD OF THE INVENTION

The field of the invention is processing of waste into energy and green hydrogen, including especially processing of biowaste from a wastewater treatment plant into energy and green hydrogen.

BACKGROUND

The background description includes information that may be useful in understanding the present invention. It is not an admission that any of the information provided herein is prior art or relevant to the presently claimed invention, or that any publication specifically or implicitly referenced is prior art.

The last few years has seen a huge emphasis on implementing a "circular economy". Generally, circular economy is based on three core principles: (1) eliminating waste and pollution, (2) re-circulating products and materials (at their highest value), and (3) regenerating nature. In a circular economy, waste does not exist, products and raw materials are (designed to be) reused, and waste is viewed as the new raw material. Waste is recycled where possible and brought back into manufacturing, agricultural, structural, or other uses. If that can't be accomplished, processed waste is used to create energy instead of being disposed at landfills.

The need for applying the circular economy principles is readily apparent in the field of wastewater treatment. Biosolids from wastewater treatment plants are typically sent to landfills. That strategy is expensive due to landfill tipping fees, environmentally destructive, and fails to take advantage of energy stored with the material. Another typical disposal option is land application of biosolids from wastewater treatment plants. Land application involves use of the biosolids from wastewater treatment plants (1) in a mix as part of composting or (2) as a fertilizer or soil amendment. This is also environmentally destructive. Per- and polyfluoroalkyl substances ("PFAS") and other harmful chemicals in the biosolids and wastewater cause agricultural and land contamination as well as contamination of nearby water sources. It is known that PFAS in the environment have been linked to harmful health effects in humans and animals.

There have been efforts to repurpose sewage sludge to generate a desirable product (e.g., hydrogen and oxygen). For example, Clausen (Lasse Røngaard Clausen, Energy efficient thermochemical conversion of very wet biomass to biofuels by integration of steam drying, steam electrolysis and gasification, Energy, 125, 327-336 (2017)) discloses processing very wet biomasses to create hydrogen and oxygen. The very wet biomasses are dried in a steam dryer, and a portion of the generated steam is fed to a solid oxide electrolysis cell to convert the steam into hydrogen and oxygen. In another example, Barghash et al. (Hind Barghash, Arwa Al Farsi, Kenneth E. Okedu, & Buthaina Mahfoud Al-Wahaibi, Cost benefit analysis for green hydrogen production from treated effluent: The case study of Oman, Front. Bioeng. Biotechnol, Volume 10 (2022)) discloses a sewage treatment plant having a new membrane bioreactor that produces treated water. The treated water is used to produce hydrogen and oxygen via electrolysis.

The above-mentioned approaches resolve only some of the issues. For example, the above-mentioned processes fail to recover water in a state that is sufficiently purified to be reused even as municipal gray water. Also, reliance on steam temperatures for processing the waste fails to eliminate PFAS (Per- and Polyfluorinated Substances). It is known to add substances to the waste to precipitate out the PFAS, but this adds extra cost, adds yet additional chemicals to the environment, and still fails to eliminate the PFAS. See for example, Shah et al. (PCT Publication No. WO2021/102519) discloses steps of gasification, pyrolysis, and combustion to degrade and destroy PFAS contaminants from PFAS-contaminated biosolids.

The fact is that a community cannot achieve "Net Zero" waste without utilizing a system that includes waste diversion of sewage sludge away from landfills, recovering energy and destroying PFAS and other dangerous chemicals entities present within the sludge, while also exporting clean water and clean solids that can be reused for agricultural or other purposes. Ideally, the system would even be energy efficient, producing net gain of usable H2 and/or electricity.

SUMMARY OF THE INVENTION

The inventive subject matter provides systems and methods in which waste is processed in a cost-effective manner to produce green hydrogen and electricity, while clean water and clean solids that can be reused for agricultural or other purposes. Contemplated systems and methods comprise (1) at least partially dehydrating a source material to produce a dried intermediate and recovered water, (2) pyrolyzing the dried intermediate to produce a syngas and a char, and (3) electrolyzing the recovered water to produce oxygen and the green hydrogen. It should be appreciated that the green hydrogen can be sold to create a major revenue stream for the plant.

The source material can advantageously comprise a sewage sludge, other wastewater or landfill leachate. Typically such materials would have a high water content, such as 60%-85% water. Once dried, the dried intermediate could typically contain 15% to 25% water.

As discussed above, PFAS contaminants can create an additional problem in waste management. It is contemplated that the step of pyrolyzing occurs within a temperature range and residence time that decomposes PFAS compounds. A temperature range to decompose PFAS compounds is 871° C.-982° C. (1600° F.-1800° F.).

It should be appreciated that at least some of the syngas can be used to produce electricity. For example, at least a portion of the syngas can be combusted to produce an exhaust stream, which can be used by a turbine that cooperates with a generator to produce the electricity. Heat from the exhaust stream can also be used to dehydrate the source material. The electricity produced can be used to assist in electrolyzing the recovered water and in other plant processes. Thus, power needs in a plant are reduced by the contemplated systems and methods.

As noted above, the green hydrogen produced can be sold to create a major revenue stream. It should be appreciated that the oxygen produced can be utilized in the plant rather than vented as often done in other systems. Other systems typically vent oxygen due to the high cost in transporting it to a location where it can be used. Rather than waste the produced oxygen, it is contemplated that produced oxygen can be utilized to reduce power needs in a plant. For example, produced oxygen can be supplied to a storage tank having source material (e.g., sludge) to encourage growth of bacteria and thereby reduce power needs and pump maintenance costs typically required for that process.

In another aspect, a system for producing green hydrogen from a biowaste is contemplated. The system comprises a dryer configured to use a dried hot air stream to dry the biowaste, and produce a moist hot air stream. The system further comprises a dehydrator that is configured to produce the dried hot air stream and condensate water from the moist hot air stream. The condensate water is electrolyzed by an electrolyzer to produce oxygen and the green hydrogen. The dried biowaste is pyrolyzed in a pyrolizer to produce a syngas and a char. A co-generation facility is configured to utilize the syngas to produce electricity.

In some embodiments, the system comprises a storage tank having an aeration bed to combine amounts of the biowaste with oxygen produced by the electrolyzer. It should be appreciated that power needs and pump maintenance costs in operating the storage tank are reduced by utilizing produced oxygen. Thus, produced oxygen can be used onsite rather than vented as often done in other systems. However, although it is unlikely, it is also contemplated that produced oxygen is vented to the atmosphere.

Power needs of the electrolyzer and other units in the system can be fulfilled by the co-generation facility and/or one or more solar panels. In some embodiments, the co-generation facility comprises a Dry Low Emission (DLE) combustor configured to combust the syngas. The combustion gas is received by a turbine and power is produced by the turbine that cooperates with a generator. It should be appreciated that waste heat from the turbine can be utilized in the dryer via a line.

PFAS compounds can be present in the biowaste. In such cases, the pyrolyzer is configured to pyrolyze the dried biowaste between 871° C.-982° C. (1600° F.-1800° F.), to thereby decompose PFAS compounds. Waste heat from the pyrolyzer is used in the dryer via a line. The dryer comprises a belt dryer configured to dry the biowaste to between 15% to 25% water.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
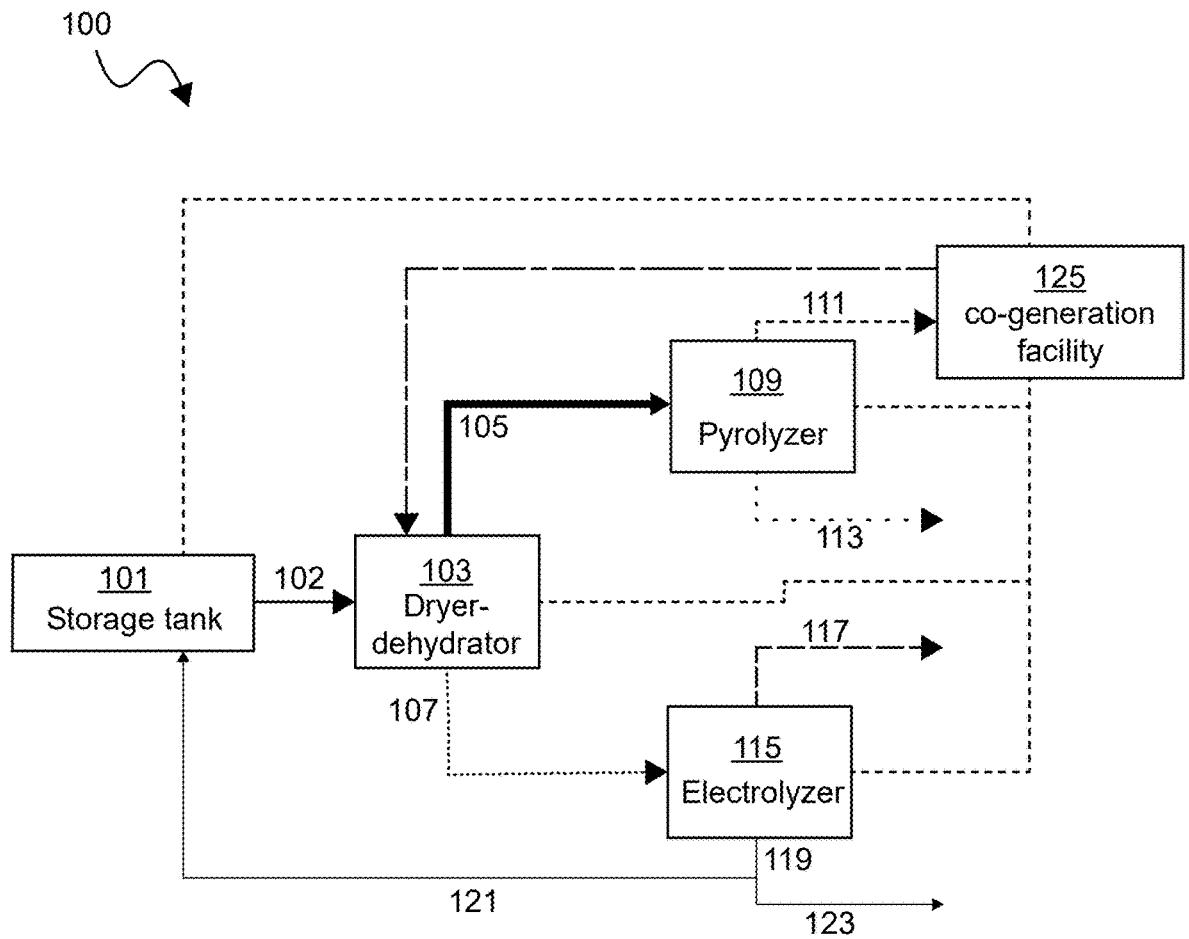
FIG. 1 is a block diagram of an exemplary system for processing a source material.

FIG. 1 shows a system 100 for processing a source material 102. Source material 102 is fed to a dryer-dehydrator 103 that dries and dehydrates source material 102 to produce a dried intermediate 105 and recovered water 107. Dried intermediate 105 is fed to a pyrolyzer 109 to produce syngas 111 and a char 113. Recovered water 107 is fed to an electrolyzer 115 to produce green hydrogen 117 and oxygen 119.

Source material 102 can comprise a biowaste (e.g., biomass, biosolids, sludge, etc.). It is contemplated that the biowaste comprises municipal at least one of wastewater and landfill leachate. Source material 102 typically has a high water content. For example, source material 102 comprises 60%-85% water. Prior to being processed, source material 102 can be stored in a storage tank 101. It is contemplated that storage tank 101 can comprise an aeration bed. To reduce the needs of storage tank 101, a portion 121 of oxygen 119 can be fed to storage tank 101. A second portion 123 of oxygen 119 can be utilized elsewhere. In other embodiments, all of oxygen 119 produced by electrolyzer 115 can be fed to storage tank 101.

Dried intermediate 105 produced by dryer-dehydrator 103 is depleted of water. For example, dried intermediate 105 can comprise 15% to 25% water. Pyrolyzer 109 is operated to produce syngas 111 and char 113 as described above. In some cases, source material 102 and dried intermediate 105 can comprise PFAS compounds. It is contemplated that pyrolyzer 109 can be operated within a temperature range and residence time that decomposes the PFAS compounds. For example, pyrolyzer 109 can be operated within a temperature range of 871° C.-982° C. (1600° F.-1800° F.) and having a residence time within a range of 10-20 minutes. It should be appreciated that decomposing PFAS compounds eliminates concerns about stricter regulations on waste containing PFAS compounds.

A co-generation facility 125 can be configured to utilize syngas 111 to produce electricity. Co-generation facility 125 can comprise a Dry Low Emission (DLE) combustor configured to combust syngas 111. Co-generation facility 125 can further comprise a turbine that cooperates with a generator to produce electricity from the combustion gas. It should be appreciated that co-generation facility 125 reduces the external energy needs of system 100. It is contemplated that power from co-generation facility 125 can be used to supply power for one or more of storage tank 101, dryer-dehydrator 103, pyrolyzer 109, and electrolyzer 115.

Waste heat from the various processes of system 100 can also be utilized. For example, waste heat from pyrolyzer 109 can be utilized in dryer-dehydrator 103 to dry source material 102. Additionally, or alternatively, waste heat from co-generation facility 125 (e.g., waste heat from the turbine) can be utilized in dryer-dehydrator 103 to dry source material 102. Waste heat can be ported via one or more lines.

Figure 2:
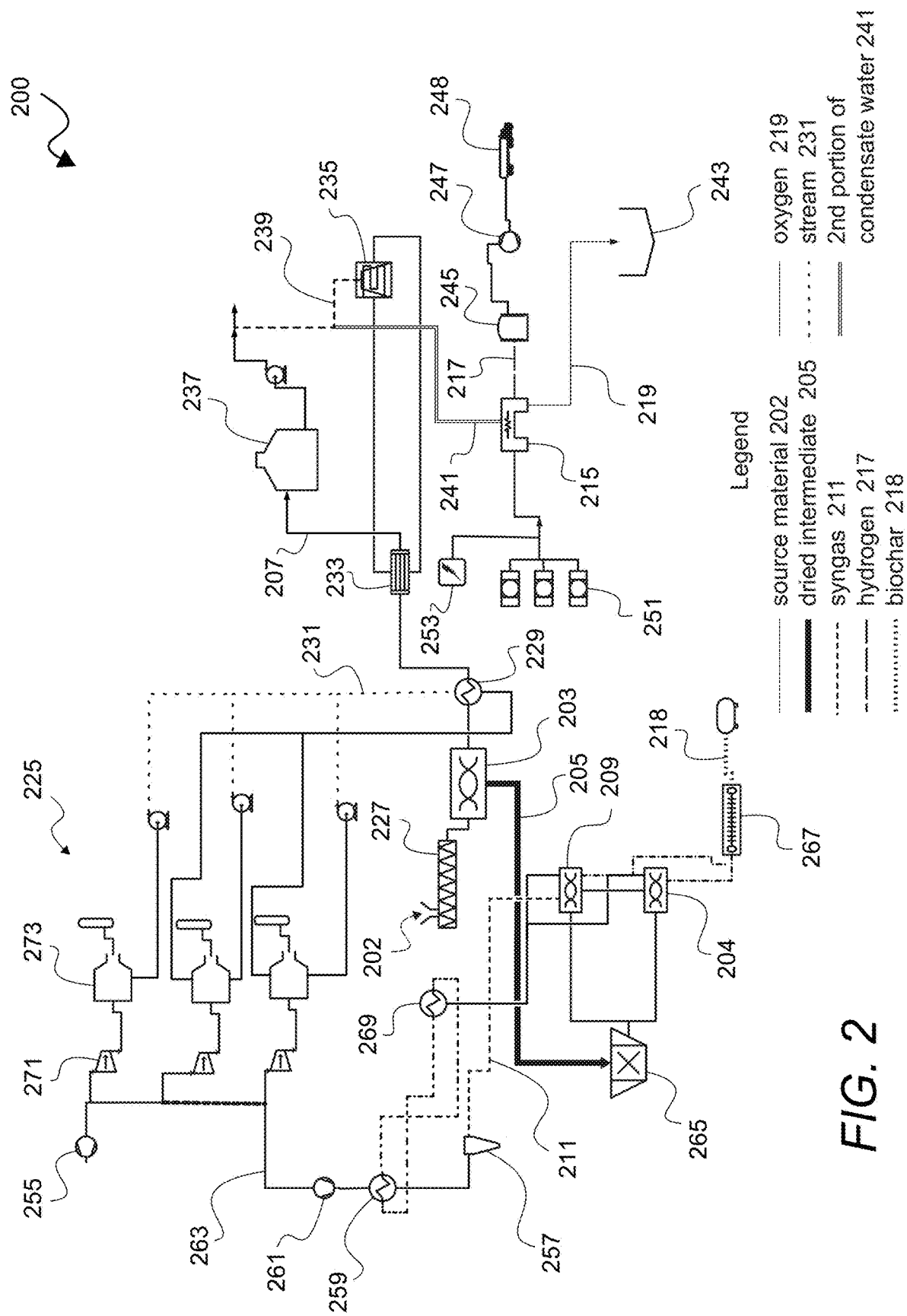
FIG. 2 is a process flow diagram of another exemplary system for processing a source material.

FIG. 2 shows a system 200 for processing a source material 202. Source material 202 is fed into a dryer 203 via an inlet feed 227. Source material 202 can comprise a biowaste (e.g., biosolid, biomass, sludge, etc.). The biowaste can comprise municipal at least one of wastewater and landfill leachate. It is contemplated that source material 202 has a high water content, such as 60%-85% water. It should be appreciated that system 200 can be used to process source materials 202 comprising PFAS compounds.

Dryer 203 at least partially dehydrates source material 202. It is contemplated dryer 203 comprises a belt conveyer on which source material 202 is placed. High velocity fans within dryer 203 evaporate water out of source material 202. In some embodiments, dryer 203 can dry 75 wet tons a day of a source material (e.g., biosolids) using 130 KW of power and 7 MMbtu/hr of 85° C. (185° F.) water. It is contemplated that one or more dryers can be used to dehydrate source material 202.

Additionally, or alternatively, waste heat from other processes in system 200 can be used to evaporate water out of source material 202. For example, waste heat from a co-generation facility 225 (e.g., high temperature heat from a gas turbine) can be used to dry source material 202 in dryer 203. It should be appreciated that using waste heat to thereby reduce the need for external heat source lowers the cost of operations.

The water recovered from source material 202 is heat exchanged with a stream 231 from co-generation facility 225 in a heat exchanger 229, and condensed in condenser 233. A hybrid chiller 235 is fluidly coupled with condenser 233 to provide a cooling stream that condenses recovered water from source material 202. Condenser 233 thereby produces a recovered condensate water 207 that can be stored in a water tank 237. It should be appreciated that recovered condensate water 207 is free of toxins from source material 202, and is considered clean for reuse or for production of hydrogen and oxygen via electrolysis.

A first portion 239 of recovered condensate water 207 can be used in hybrid chiller 235 to reduce the need for an external water source. A second portion 241 of recovered condensate water 207 can be fed to an electrolyzer 215. Electrolyzer 215 electrolyzes recovered condensate water 207 to thereby produce oxygen 219 and hydrogen 217.

Electrolyzer 215 can be a containerized proton exchange membrane (PEM) electrolyzer. It is contemplated that one or more electrolyzers can be used to electrolyze recovered condensate water 207. The one or more electrolyzers can include a power conditioning section, a proton ion section, and a cooling section.

Hydrogen 217 can be compressed and stored in a hydrogen storage 245. It is contemplated that hydrogen 217 can be used for fuel cell vehicles. In such embodiments, hydrogen 217 exits electrolyzer 215 at 300 psig and is compressed via 3 stage diaphragm compression to a storage pressure of 7,500 psig. From hydrogen storage 245, hydrogen 217 can then be fed to a compressor 247 and industry standard tube trailers 248 that will transport the hydrogen to local refueling stations.

It should be noted that oxygen is a valuable product in wastewater treatment plants having an aeration system. Oxygen 219 can be injected into an aeration system 243 via a blower. It is contemplated that use of oxygen 219 can help a wastewater treatment plant reduce the power of aeration blowers HP loads by an upwards of 20%. The blower loads are a major factor in electricity usage in wastewater treatment plants. A conservative estimate is that the plant can reduce its blower flow by 100,000 ft$^3$/hr.

Electrolyzer 215 can be partially powered by one or more solar panels 251. It is contemplated that the one or more solar panels 251 can be placed on a rooftop of system 200, such as a 2 MW solar array on the rooftop. Additionally, or alternatively, electrolyzer 215 can be partially powered by co-generation facility 225. In FIG. 2, the power from co-generation facility 225 is illustrated as element 253. It is contemplated that the one or more solar panels 251 can be used to provide power to a building that houses equipment (e.g., dryer 203). Although a rooftop mounted solar panel system is described, it is contemplated that the one or more solar panels 251 can be ground mounted or there can be a mix of ground and roof mounted solar panels. Thus, renewable energy sources can be used to power electrolyzer 215 to produce green hydrogen 217 and oxygen 219.

As discussed above, source material 202 is dehydrated in dryer 203. Dryer 203 then produces a dried intermediate 205 having a low water content, such as 15% to 25% water. Dried intermediate 205 is fed to feeder 265, which feeds portions of dried intermediate 205 to first and second thermal convertors 209, 204. It is contemplated that dried intermediate 205 enters first and second thermal convertors 209, 204 via an air lock mechanism so that convertors 209, 204 remain oxygen free for pyrolysis. First and second thermal convertors 209, 204 break down dried intermediate 205 to syngas 211 and a biochar 218.

First and second thermal convertors 209, 204 can be operated within a temperature range and residence time that decomposes PFAS compounds. For example, first and second thermal convertors 209, 204 can be operated within a temperature range of 871° C.-982° C. (1600° F.-1800° F.) and having a residence time within a range of 10-20 minutes. First and second thermal convertors 209, 204 can be externally heated by a combination of natural gas (startup fuel) then product syngas (produced via the process). First and second thermal convertors 209, 204 are capable to operate to temperatures up to 1400° C. (2550° F.). It should be appreciated that the number of thermal convertors will depend on the volume being processed. Thus, contemplated systems can have only one thermal convertor or more than two thermal convertors.

Biochar 218 exits first and second thermal convertors 209, 204 and is cooled in an auger screw 267. It is contemplated that biochar 218 can be used as a soil amendment or can be taken to a landfill as ADC (Alternate Daily Cover) that will not be considered as disposal and will help mitigate greenhouse gases that are generated daily. Waste heat from first and second thermal convertors 209, 204 can be used in heat exchangers (shown as heat exchanger 269) throughout system 200, and also as a source of heat to dry source material 202 in dryer 203.

Syngas 211 is fed to a cyclone 257 and cooled by cooler 259. Once cooled, syngas 211 is compressed in compressor 261 for use in co-generation facility 225 to generate power. Co-generation facility 225 comprises three gas turbines 271. It is contemplated that co-generation facility 225 can have a different number of gas turbines 271. One or more of gas turbines 271 utilize (1) natural gas or renewable natural gas 255 (e.g., biogas from digestors at a wastewater treatment plant) and/or (2) compressed syngas 263. For example, two of gas turbines 271 can utilize natural gas or renewable natural gas 255, while the remaining gas turbine 271 can be a dual fueled turbine that will utilize one or more of compressed syngas 263 and natural gas or renewable natural gas 255 as a backup fuel.

It is contemplated that one or more of gas turbines 271 is a 1.7 MWe gas turbine, manufactured by OPRA (e.g., OPRA OP16). Other similar gas turbines that do not require additional conditioning of syngas are also contemplated. Gas turbines 271 can operate on an array of fuels both gas and liquid. It is contemplated that the combustors of gas turbines 271 are Dry Low Emission (DLE) combustors to minimize NOx & CO emissions. Waste heat generated by gas turbines 271 can be utilized in dryer 203 to dehydrate source material 202.

Advantages

There are huge advantages of the claimed systems and methods relative to the prior art.

(1) Use of a high temperature thermal pyrolizer reduces greenhouse gas emissions that would otherwise be released into the atmosphere from (1) a waste disposal site, (2) combusting the waste, or (3) transporting the waste to landfills or for land application. Pyrolysis can be integrated with existing MRF/Recycling operations. Pyrolysis operates at temperatures that can destroy PFAS and other toxins in Biosolids.

(2) Use of a high temperature thermal pyrolizer readily handles multiple different types of waste. This includes Biosolids/Sewage Sludge, including: sludge with PFAS; municipal solid waste ("MSW") that includes plastics and general household waste. Industrial and Commercial Waste as well as C&D waste medical waste, contaminated soil for remediation; (i.e., PCBs and other contaminates including PFAS/PFOS); oil sludges; agricultural and animal waste biomass and even wood waste and automotive tires.

(3) Use of a high temperature thermal pyrolizer in conjunction with a co-generation facility producing electricity from the off gases, provide clean, renewable energy, reliable power (with up to 24/7 operations). The system meets all EPA/AQMD regulations. Permitting has already been secured by the US Army, and by San Bernadino County the Mohave Desert Air Quality Management District in California.

(4) Use of a high temperature thermal pyrolizer compliments recycling operations and reduces landfilling. The carbon char residue from pyrolysis has been tested on multiple waste streams and was found to be non-hazardous. Not only does this allow for the carbon char to be used in materials, it can be used as a fuel in cement kilns and also be classified as Alternate Daily Cover (ADC) for landfills where it can capture odors and additional GHG emissions. Regardless of where the carbon char is transported, the cost of transportation are reduce by up to 80%.

(5) Use of low temperature drying (104-158 F) meets the EPA 502 Class A regulations for time and temperature. Use of a dehumidification heat pump cycle is the most efficient way to dry sludge using hot air closed conventional recycling, condensing, dehumidifying and drying. Using waste heat from the pyrolyzer is calculated to reduce the electric load on the dryer by 80% with 36 kWh capable of drying 1 metric ton of dewatered sludge.

(6) The system only requires that sludge be dried to 20-25% moisture content, while most gasification systems need a moisture content of 5% or less (7) The water recovered from the drying process is used to make green Hydrogen, which is local to the processing plant. This can greatly reduce transportation costs for distribution of Hydrogen produced by other means. Water produced but not electrolyzed can be used for the benefit of the community.

Thus, contemplated systems and methods reduce tipping fees that are problematic when handling waste. Furthermore, as discussed above, the production of hydrogen and oxygen via electrolysis of recovered water can have significant benefits in plant operations. Finally, a green energy solution to reducing power in plant operations is achieved by power generation from syngas produced from pyrolyzing a dried intermediate of a source material (e.g., biowaste-biomass, biosolids, sludge, etc.).

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The recitation of ranges of values herein is merely intended to serve as a shorthand method of referring individually to each separate value falling within the range. Unless otherwise indicated herein, each individual value is incorporated into the specification as if it were individually recited herein, and ranges include their endpoints.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of producing green hydrogen, comprising:
   at least partially dehydrating a source material to produce a dried intermediate and recovered water;
   feeding a first portion of the recovered water to a hybrid chiller to be used as a cooling stream for a condenser;
   feeding the dried intermediate to at least one thermal convertor via an airlock mechanism, wherein the airlock mechanism ensures the at least one thermal convertor remains oxygen-free for pyrolysis;
   pyrolyzing the dried intermediate to produce a syngas and a char; and electrolyzing a second portion of the recovered water to produce oxygen and the green hydrogen.

2. The method of claim 1, wherein the source material comprises a biowaste.

3. The method of claim 1, wherein the biowaste comprises municipal at least one of wastewater and landfill leachate.

4. The method of claim 1, wherein the source material comprises 60%-85% water.

5. The method of claim 1, wherein the dried intermediate comprises 15% to 25% water.

6. The method of claim 1, further comprising supplying at least some of the oxygen to a vessel containing the source material.

7. The method of claim 1, wherein the step of pyrolyzing occurs within a temperature range and residence time that decomposes Per- and Polyfluoroalkyl Substances (PFAS) compounds.

8. The method of claim 7, wherein the temperature range is 871° C.-982° C. (1600° F.-1800° F.).

9. The method of claim 1, further comprising using at least some of the syngas to produce electricity.

10. The method of claim 9, further comprising combusting the syngas to produce an exhaust stream, and utilizing a turbine that cooperates with a generator to produce the electricity from the exhaust stream.

11. The method of claim 10, further comprising using heat from the exhaust stream as a heat source for dehydrating the source material.

12. The method of claim 9, further comprising combusting the syngas using a Dry Low Emission (DLE) combustor.

13. The method of claim 1, further comprising using electricity derived from combusting the syngas to electrolyze the recovered water.

14. The method of claim 13, further comprising using at least electricity not derived from combusting the syngas to assist in electrolyzing the recovered water.

15. A system for producing green hydrogen from a biowaste, comprising:
- a dryer configured to use a dried hot air stream to at least partially dehydrate the biowaste, and produce recovered water and a dried biowaste;
- a hybrid chiller configured to receive a first portion of the recovered water to be used as a cooling stream for a condenser;
- at least one thermal convertor configured to receive the dried biowaste via an airlock mechanism, wherein the airlock mechanisms ensures that the at least one thermal convertor remains oxygen-free for pyrolysis;
- an electrolyzer configured to electrolyze a second portion of the recovered water to produce oxygen and the green hydrogen;
- the at least one thermal convertor configured to pyrolyze the dried biowaste to produce a syngas and a char; and
- a co-generation facility configured to utilize the syngas to produce electricity.

16. The system of claim 15, wherein the dryer comprises a belt dryer configured to dry the biowaste to between 15% to 25% water.

17. The system of claim 15, further comprising a storage tank having an aeration bed configured to combine amounts of the biowaste with oxygen produced by the electrolyzer.

18. The system of claim 15, wherein the at least one thermal convertor is configured to pyrolyze the dried biowaste between 871° C.-982° C. (1600° F.-1800° F.).

* * * * *